(12) United States Patent
Schwartz

(10) Patent No.: US 11,719,005 B2
(45) Date of Patent: Aug. 8, 2023

(54) AUTONOMOUS POWER TROWEL

(71) Applicant: Merlie Schwartz, Brinkhaven, OH (US)

(72) Inventor: Merlie Schwartz, Brinkhaven, OH (US)

( * ) Notice: Subject to any disclaimer, the term of this patent is extended or adjusted under 35 U.S.C. 154(b) by 401 days.

(21) Appl. No.: 16/683,195

(22) Filed: Nov. 13, 2019

(65) Prior Publication Data
US 2021/0140181 A1    May 13, 2021

(51) Int. Cl.
*E04F 21/24* (2006.01)
*G05D 1/02* (2020.01)

(52) U.S. Cl.
CPC .......... *E04F 21/247* (2013.01); *E04F 21/245* (2013.01); *G05D 1/0227* (2013.01); *G05D 1/0285* (2013.01)

(58) Field of Classification Search
CPC .................................................... E04F 21/245
See application file for complete search history.

(56) References Cited

U.S. PATENT DOCUMENTS

| | | | | |
|---|---|---|---|---|
| 4,117,060 A * | 9/1978 | Murray | .................. | C04B 28/02 264/82 |
| 4,600,999 A | 7/1986 | Ito et al. | | |
| 4,676,691 A | 6/1987 | Morrison | | |
| 5,023,788 A | 6/1991 | Kitazume et al. | | |
| 5,102,258 A | 4/1992 | Berger | | |
| 6,374,155 B1 * | 4/2002 | Wallach | ............... | G05D 1/0295 701/25 |
| 9,068,300 B2 | 6/2015 | Fielder | | |
| 10,577,810 B2 * | 3/2020 | Telleria | ................... | B05B 12/32 |
| 2006/0231675 A1 * | 10/2006 | Bostan | .................... | B64C 27/20 244/12.1 |
| 2008/0144925 A1 * | 6/2008 | Zhu | ........................ | G06T 7/593 382/154 |

FOREIGN PATENT DOCUMENTS

WO    WO-2019176733 A1 *    9/2019

OTHER PUBLICATIONS

Translation of WO 2019176733 A1 (Year: 2019).*

* cited by examiner

*Primary Examiner* — Nicholas Kiswanto
*Assistant Examiner* — Christopher A Buksa
(74) *Attorney, Agent, or Firm* — Porter Wright Morris & Arthur LLP

(57) ABSTRACT

An autonomous power trowel includes a frame supported by at least one rotor having a plurality of troweling blades, at least one power source for selectively rotating the rotor to finish an upper surface of the concrete, at least one actuator onboard the frame for selectively tilting the rotor, and a communication system onboard the frame for communicating with at least one remote communication device. Also included are a plurality of sensors onboard the frame for sensing exterior boundaries of the concrete, and at least one inspection camera for viewing the upper surface of the concrete. A controller onboard the frame is configured to selectively operate the power source, to selectively operate the actuator, to receive communications from the remote communication device, to receive signals from the sensors, and to receive signals from the inspection camera to detect any surface blemish in the concrete.

14 Claims, 8 Drawing Sheets

AUTONOMOUS POWER TROWEL

CROSS-REFERENCE TO RELATED APPLICATIONS

This application claims the priority benefit of U.S. provisional patent application No. 62/760,540 filed on Nov. 13, 2018, the disclosure of which is expressly incorporated herein in its entirety by reference.

STATEMENT REGARDING FEDERALLY SPONSORED RESEARCH

Not applicable

PARTIES TO A JOINT RESEARCH AGREEMENT

Not Applicable

REFERENCE TO APPENDIX

Not applicable

FIELD OF THE INVENTION

The field of the present invention relates to concrete finishing equipment, and more particularly, to power trowels for surface finishing concrete slabs and floors.

BACKGROUND OF THE INVENTION

A motorized or power trowel (also known as a "power float") is a piece of light construction equipment used by construction companies and contractors to apply a smooth finish to the upper surface of concrete floors and slabs. Both walk-behind and ride-on power trowels are currently available.

A walk-behind power trowel is controlled by an operator walking behind the machine, controlling the power trowel with provided controls. See U.S. Pat. Nos. 4,676,691 and 5,102,258 for examples of walk-behind power trowels, the disclosures of which are expressly incorporated herein in their entireties by reference.

As shown in FIG. 1, a ride-on power trowel 1 typically includes two counter rotating bladed rotors that downwardly project to frictionally contact the upper surface of the concrete for finishing. The rotors are driven by one or more engines mounted on the frame. The ride-on power trowel 1 is controlled by an operator sitting on a seat on the machine and operating manually-actuated electronic steering controls 2 with their hands and manually-actuated throttle pedals 3 with their feet. The steering controls tilt the axes of rotation of the bladed rotors to steer the power trowel. The throttle pedals control the throttle of the one or more engines driving the bladed rotors to vary speed of the power trowel. See U.S. Pat. No. 9,068,300 for an example of a ride-on power trowel, the disclosure of which is expressly incorporated herein in its entirety by reference.

Concrete surface finishing requires a skilled craftsman that can obtain desired smoothness and flatness for the upper surface of the concrete floor or slab. However, the working hours as a concrete surface finisher are long and difficult and often require many evening and night time hours because the concrete must be surface finished soon after it is poured which typically occurs during the daytime. As a result, there are fewer and fewer skilled concrete finishers available. One attempt to solve this problem is a power trowel in which movement can be controlled by a RF controller much like a radio-controlled plane, car, or boat. However, this solution still requires an operator to be present and controlling movement of the power trowel throughout the finishing process.

Another attempt to solve this problem has been the creation of robots that finish concrete floors according to preprogrammed patterns and/or within preset boundaries. For example, see U.S. Pat. No. 5,023,788, the disclosure of which is expressly incorporated herein in its entirety by reference. While such robots may be somewhat effective, they can be difficult to use because they must be reprogrammed for the running pattern and/or boundary each time they are used and do not necessary finish the concrete to within desired parameters as does a skilled craftsman.

Accordingly, a need remains for an autonomous power trowel for finishing concrete slabs and floors that is relatively easy to use and/or that requires no one at the job site during the entire finishing process.

SUMMARY OF THE INVENTION

The present invention provides autonomous power trowels for finishing concrete slabs and floors which address at least one of the above-noted problems of the related prior art. Disclosed herein is an a power trowel for finishing an upper surface of a concrete slab or floor. The power trowel comprises a frame supported by at least one rotor having a plurality of troweling blades for engaging the concreate, at least one power source onboard the frame for selectively rotating the at least one rotor to finish the concrete, at least one actuator onboard the frame for selectively tilting the at least one rotor, a communication system onboard the frame for communicating with at least one remote communication device, a plurality of sensors onboard the frame for sensing external boundaries of the concrete, and at least one inspection camera onboard the frame for viewing the upper surface of the concrete. A controller onboard the frame is configured to selectively operate the at least one power source to rotate the at least one rotor to finish the concrete, to selectively operate the at least one actuator to tilt the at least one rotor to steer the frame and to move the frame in a desired direction, to receive communications from the at least one remote communication device via the communications system, to receive signals from the plurality of sensors to stay within the external boundaries, and to receive signals from the at least one inspection camera to detect any surface blemish in the upper surface of the concrete.

Additionally disclosed is a power trowel power trowel for finishing an upper surface of a concrete slab or floor. The power trowel comprises a frame supported by at least one rotor having a plurality of troweling blades for engaging the concrete, at least one power source onboard the frame for selectively rotating the at least one rotor to finish the concrete, at least one actuator onboard the frame for selectively tilting the at least one rotor, a communication system onboard the frame for communicating with at least one remote communication device, a plurality of sensors onboard the frame for sensing external boundaries of the concrete, and first and second stereoscopic camera arrays adapted to cooperate with one or more retroreflective visual targets to form an internal boundary of the concrete. A controller onboard the frame is configured to selectively operate the at least one power source to rotate the at least one rotor to finish the concrete, to selectively operate the at least one actuator to tilt the at least one rotor to steer the frame and move the frame in a desired direction, to receive communications from the at least one remote communication device via the communications system, to receive signals from the plurality of sensors to stay within the external boundaries, and to receive signals from the first and second stereoscopic camera arrays to stay within the internal boundary.

Further disclosed is a method for finishing an upper surface of a concrete slab or floor using a power trowel. The power trowel comprises a frame supported by at least one rotor having a plurality of troweling blades for engaging the concrete, at least one power source onboard the frame for selectively rotating the at least one rotor to finish the concrete, at least one actuator onboard the frame for selectively tilting the at least one rotor, a communication system onboard the frame for communicating with at least one remote communication device, a plurality of sensors onboard the frame for sensing external boundaries of the concrete, at least one inspection camera onboard the frame for viewing the upper surface of the concrete, and an onboard controller. The method comprising the steps of selectively operating the at least one power source via the onboard controller to rotate the at least one rotor to finish the concrete, selectively operating the at least one actuator via the onboard controller to tilt the at least one rotor to steer the frame and to move the frame in a desired direction, receiving communications to the onboard controller from the at least one remote communication device via the communications system, receiving signals via the controller from the plurality of sensors to stay within the external boundaries of the concrete, and receiving signals via the onboard controller from the at least one inspection camera to detect any surface blemish in the upper surface of the concrete.

From the foregoing disclosure and the following more detailed description of various preferred embodiments it will be apparent to those skilled in the art that the present invention provides a significant advance in the technology and art of power trowels for finishing concrete. Particularly, significant in this regard is the potential the invention affords for providing a reliable, effective, and easy to use autonomous power trowel for finishing concrete. Additional features and advantages of the invention will be better understood in view of the detailed description provided below.

BRIEF DESCRIPTION OF THE DRAWINGS

These and further objects of the invention will become apparent from the following detailed description.

Figure 1:
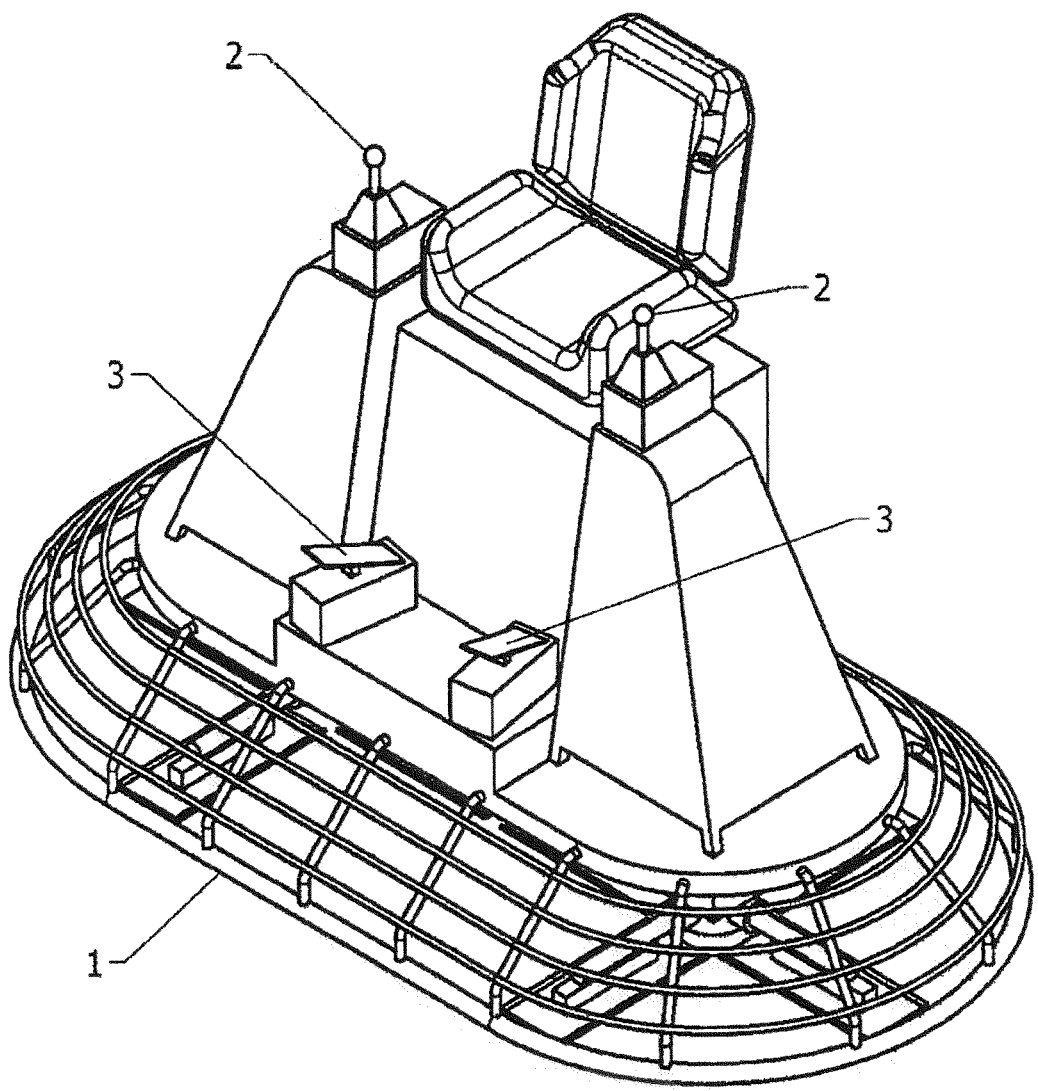
FIG. 1 is perspective view of a ride-on power trowel for finishing concrete according to the prior art.

It should be understood that the appended drawings are not necessarily to scale, presenting a somewhat simplified representation of various preferred features illustrative of the basic principles of the invention. The specific design features as disclosed herein, including, for example, specific dimensions, orientations, locations, and shapes will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientations illustrated in the drawings. In general, up or upward generally refers to an upward direction out of the plane of the paper in FIG. 5 and down or downward generally refers to a downward direction into the plane of the paper in FIG. 5. Also in general, front or forward generally refers to an upward direction within the plane of the paper in FIG. 5 and rear or rearward generally refers to a downward direction within the plane of the paper in FIG. 5.

DETAILED DESCRIPTION OF CERTAIN PREFERRED EMBODIMENTS

It will be apparent to those skilled in the art, that is, to those who have knowledge or experience in this area of technology, that many uses and design variations are possible for the systems, methods, and software for power trowels disclosed herein. The following detailed discussion of various alternative and preferred embodiments will illustrate the general principles of the invention with regard to a particular embodiment. Other embodiments suitable for other applications will be apparent to those skilled in the art given the benefit of this disclosure.

Figure 2:
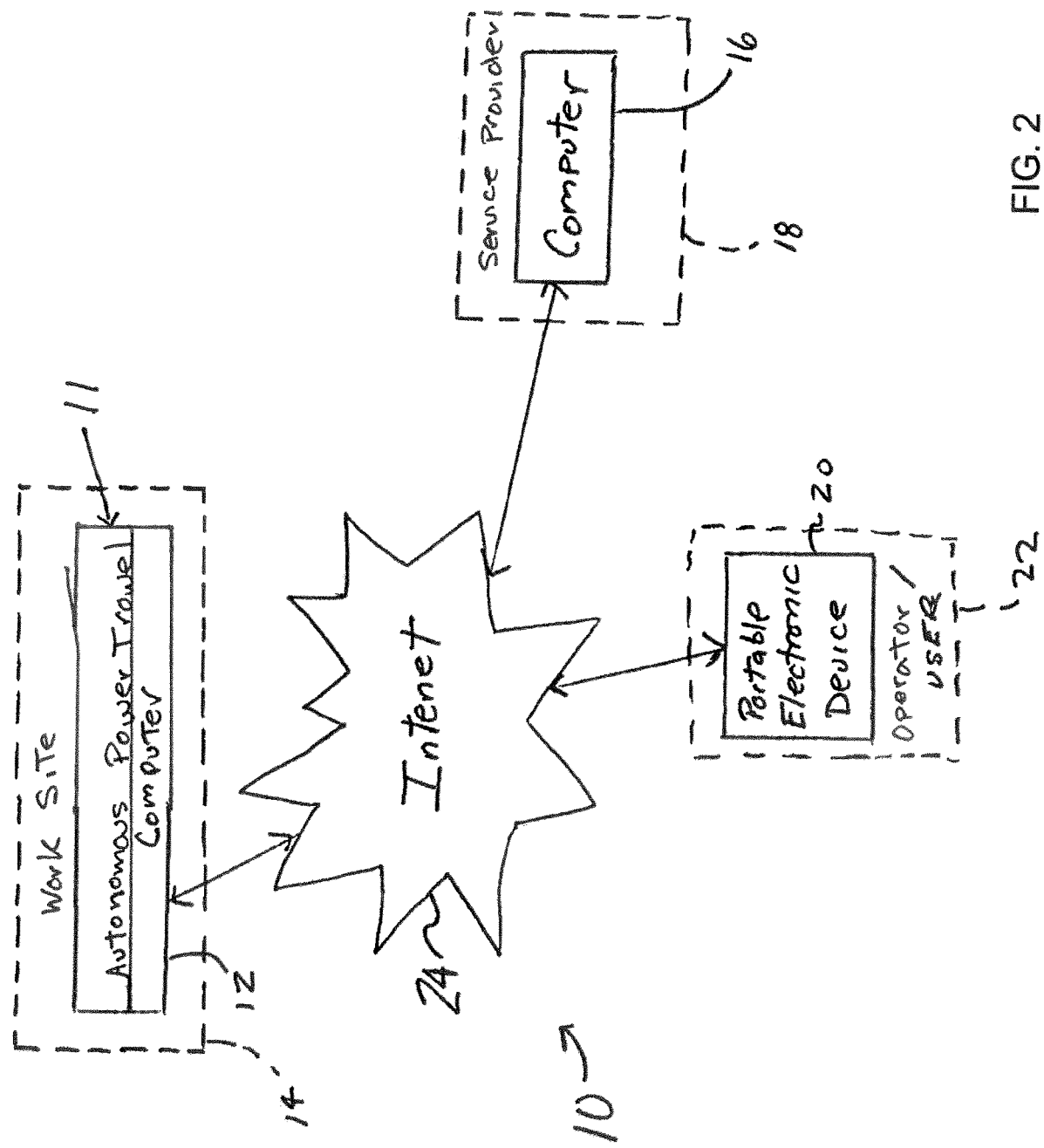
FIG. 2 is a schematic view of a power trowel system for finishing concrete according to the present invention.

Referring now to the drawings, FIG. 2 illustrates a system 10 for electronically facilitating concrete surface finishing using autonomous power trowels 11 according to the present invention. The illustrated system 10 includes at least one automated power trowel 11 having an onboard electronic computer or controller 12 located at a work site 14, at least one user or operator server or computer 16 located at a service provider location 18 remote from the work site 14, and at least one mobile device or portable electronic device 20 of a user or operator 22 located wherever the operator is located. The term "server" is used in the specification and claims to mean a computer configured to manage, store, send and process data 24-hours a day. The term "computer" is used in the specification and claims to mean any electronic device that can suitably communicate via a computer network including, but not limited to, desktop computers, laptop computers, notebook computers, tablet computers, smart phones, personal digital assistants (PDAs), digital cameras, mp3 players, video game systems, messaging systems, video players, smart televisions, and the like. The terms "portable electronic device" and "mobile device" are used in the specification and claims to mean a handheld electronic device that utilizes rechargeable batteries as a power source and that that can suitably communicate with event system server via the computer network including, but not limited to, smart phones, personal digital assistants (PDAs), mp3 or other music players, video game players, messaging systems, tablet computers, notebook computers, and the like The illustrated automated power trowel computer or controller 12, the illustrated user computer 16, and the illustrated user mobile device 20 are in electronic communication with one another via a communication system 24. The illustrated communication system 24 is a computer network such as, for example but not limited to, the Internet but any other suitable communication system can alternatively be utilized such as, for example but not limited to, an intranet, any other type network of computers, and the like.

The illustrated power trowel onboard controller 12 is typically physically located at the work site 14. That is, physically located wherever the automated power trowel 11 is located and is typically located onboard the power trowel 11. It is noted that that while the illustrated system 10 shows a single automated power trowel 11 having a single onboard controller 12, it should be appreciated that there is typically many more than one power trowel 11 having the onboard controller 12 and each power trowel 11 can have more than one onboard controller 12.

Figure 3:
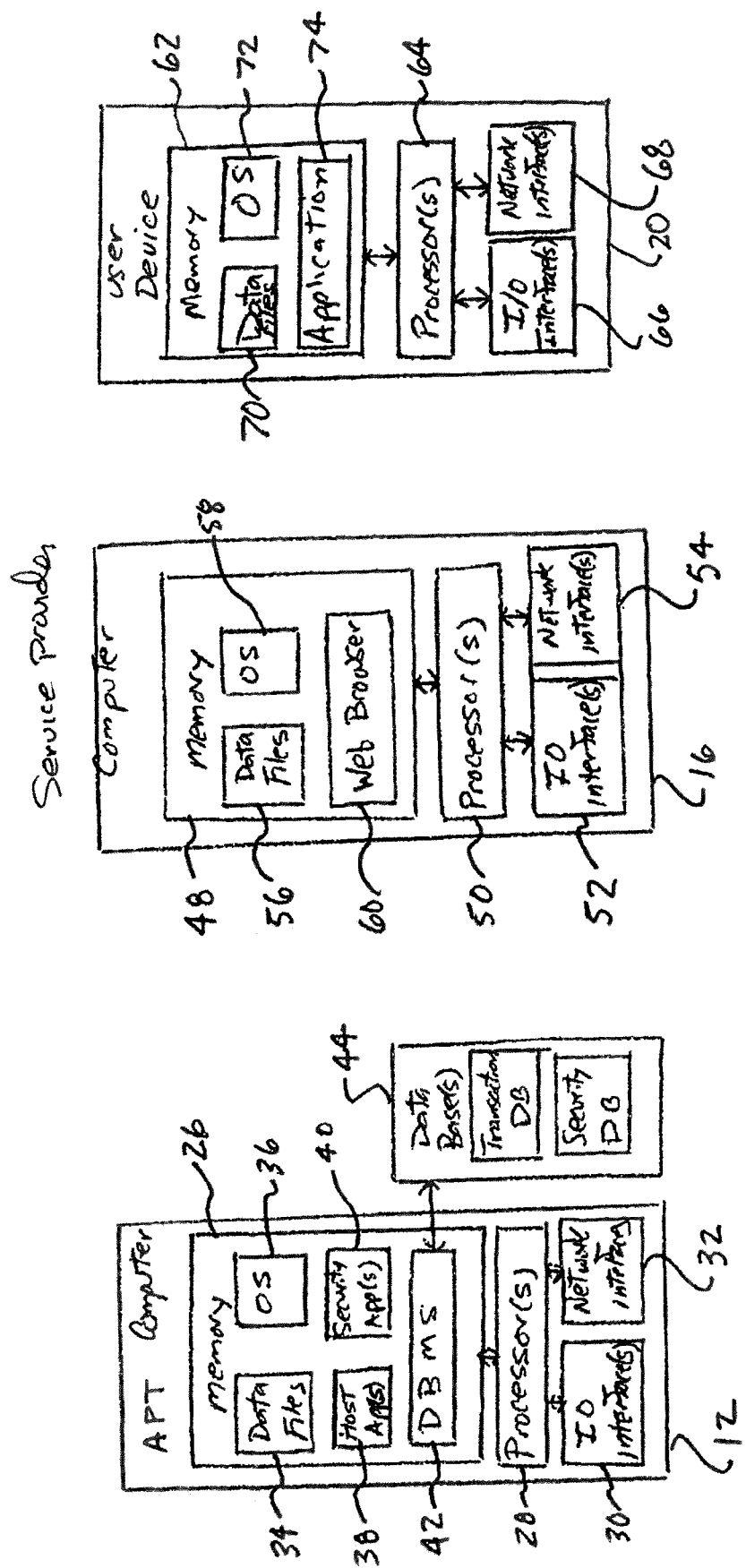
FIG. 3A is a schematic view of an exemplary power trowel computer or controller of the system of FIG. 2.
FIG. 3B is a schematic view of an exemplary service provider computer of the system of FIG. 2.
FIG. 3C is a schematic view of an exemplary user mobile device of the system of FIG. 2.

The illustrated power trowel onboard controller 12 includes memory 26, at least one processor or central processing units (CPU) 28 in communication with the memory 26, one or more input/output (IO) interfaces 30 in communication with the processor 28, and at least one network interface 32 in communication with the processor 28, all of which is configured to carry out the functions and steps described herein (best shown in FIG. 3A). The illustrated memory 26 stores data files 34, an operating system (OS) 36, host applications 38 for communications with mobile applications, security applications 40 for limiting access to authorized users, and a database management system 42 for interfacing with databases 44 having stored information. It is noted that any other suitable information and/or software can be stored in the processor 28 and/or the memory 26. The illustrated databases 44 are separate from the service provider server or computer 16 but it is noted that the databases 44 can alternatively be integrated with the service provider server or computer 16. The illustrated databases 44 include a transaction database and a security database but any other suitable types of databases can alternatively or additionally be utilized. The at least one processor 28 can be of any suitable type. The at least one IO interface 30 can be of any suitable type such as, for example but not limited to, a keyboard, a mouse, a track ball, a touch pad, a camera, a speaker, a monitor, a printer, a modem, a disk drive and the like or a combination thereof. The network interface 32 can be of any suitable type such as, for example but not limited to, a network interface card, software simulating a network card, and the like or a combination thereof. The illustrated processor 28 and memory 26 are programmed with computer software for facilitating operation of the automated power trowel 11 and for interfacing with the service provider computer 16 and the user mobile device 22 as described in more detail hereinafter.

The illustrated service provider computer 16 is typically physically located at the service provider site 18, that is physically located wherever the office of the service provider 16 is located. It is noted that that while the illustrated system 10 shows a single service provider computer 16, it should be appreciated that there can be many more than one service provider computer 16.

The illustrated service provider computer 16 includes memory 48, at least one processor or central processing units (CPU) 50 in communication with the memory 48, one or more input/output (IO) interfaces 52 in communication with the processor 50, and at least one network interface 54 in communication with the processor 50, all of which is configured to carry out the functions and steps described herein (best shown in FIG. 3B). The illustrated memory 48 stores data files 56, an operating system (OS) 58, host applications 38 for communications with mobile applications, security applications, and web browser 60. It is noted that any other suitable information and/or software can be stored in the processor 50 and/or the memory 48. The at least one processor 50 can be of any suitable type. The at least one IO interface 52 can be of any suitable type such as, for example but not limited to, a keyboard, a mouse, a track ball, a touch pad, a camera, a speaker, a monitor, a printer, a modem, a disk drive and the like or a combination thereof. The network interface 54 can be of any suitable type such as, for example but not limited to, a network interface card, software simulating a network card, and the like or a combination thereof. The illustrated processor 50 and memory 48 are programmed with computer software for and for interfacing with the automated power trowel 11 and for interfacing with the user mobile device 22 as described in more detail hereinafter.

The illustrated user mobile device 20 is typically physically located with the user 22, that is physically located wherever the operator is located. It is noted that that while the illustrated system 10 shows a single user 22 having a single mobile device 20, it should be appreciated that there is typically many more than one user 22 having one or more mobile devices 20.

The illustrated user mobile device 20 include memory 62, at least one processor or central processing units (CPU) 64 in communication with the memory 62, one or more input/output (IO) interfaces 66 in communication with the processor 64, and at least one network interface 68 in communication with the processor 62, all of which is configured to carry out the functions and steps described herein (best shown in FIG. 3C). The illustrated memory 62 stores data files 70, an operating system (OS) 72, and a mobile application 74. It is noted that any other suitable information and/or software can be stored in the processor 64 and/or memory 66. The at least one processor 64 can be of any suitable type. The at least one IO interface 66 can be of any suitable type such as, for example but not limited to, a keyboard, a mouse, a track ball, a touch pad, a camera, a speaker, a touch screen, and the like or a combination thereof. The network interface 68 can be of any suitable type such as, for example but not limited to, a network interface card, software simulating a network card, and the like or a combination thereof. The illustrated processor 64 and memory 62 are programmed with the mobile app or application 74 for communicating with the service provider server 16 as described in more detail hereinafter. The terms "mobile app" and "mobile application" are used in the specification and claims to mean a type of application software designed to run on a mobile device to provide users with similar services to those accessed on personal computers.

The illustrated system software or web platform resides at the service provider server 16 and is accessible to a user 22 via a mobile application dashboard or home page on the user's mobile device 20.

Figure 4:
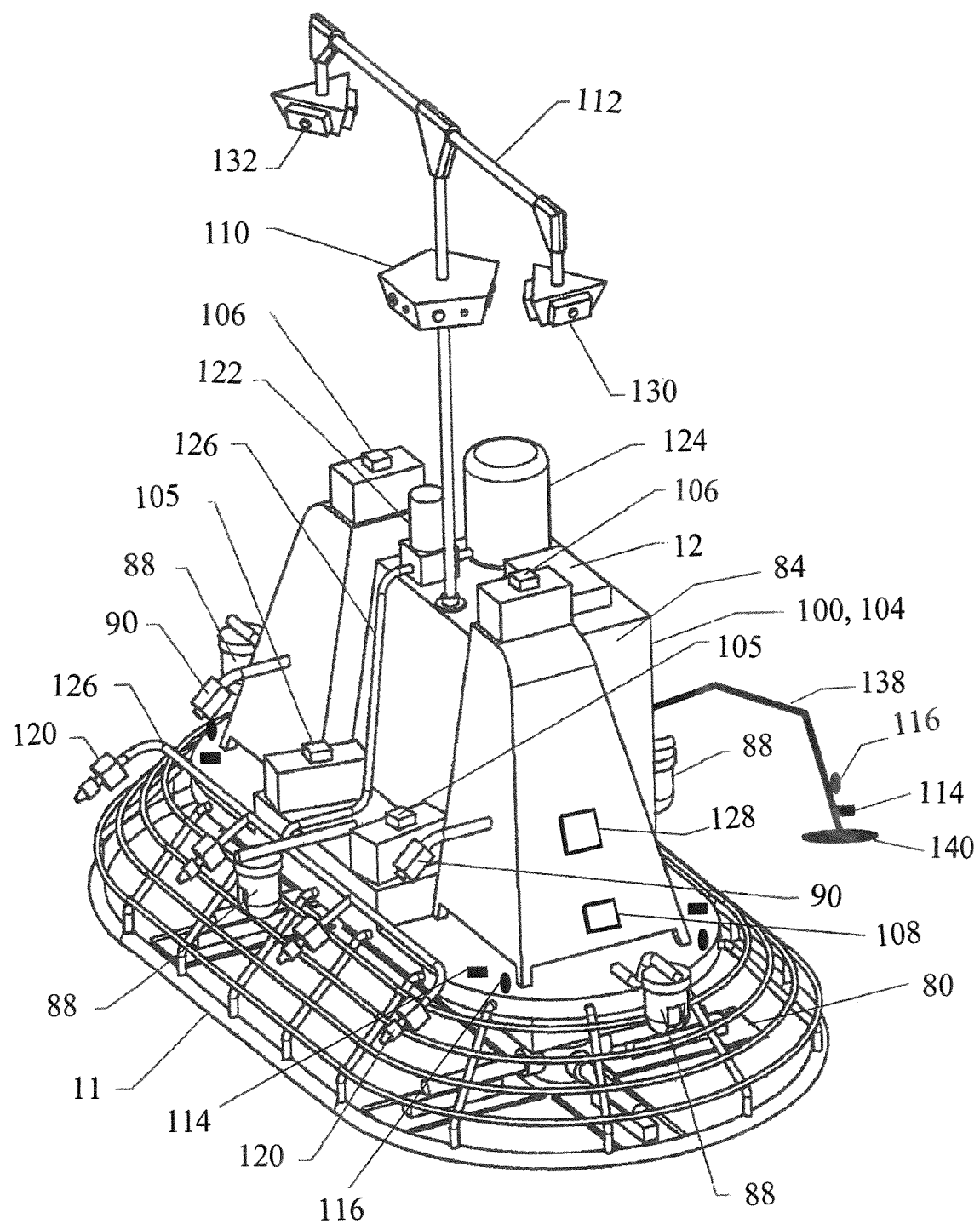
FIG. 4 is perspective view of an exemplary autonomous power trowel of the system of FIG. 2.
Figure 5:
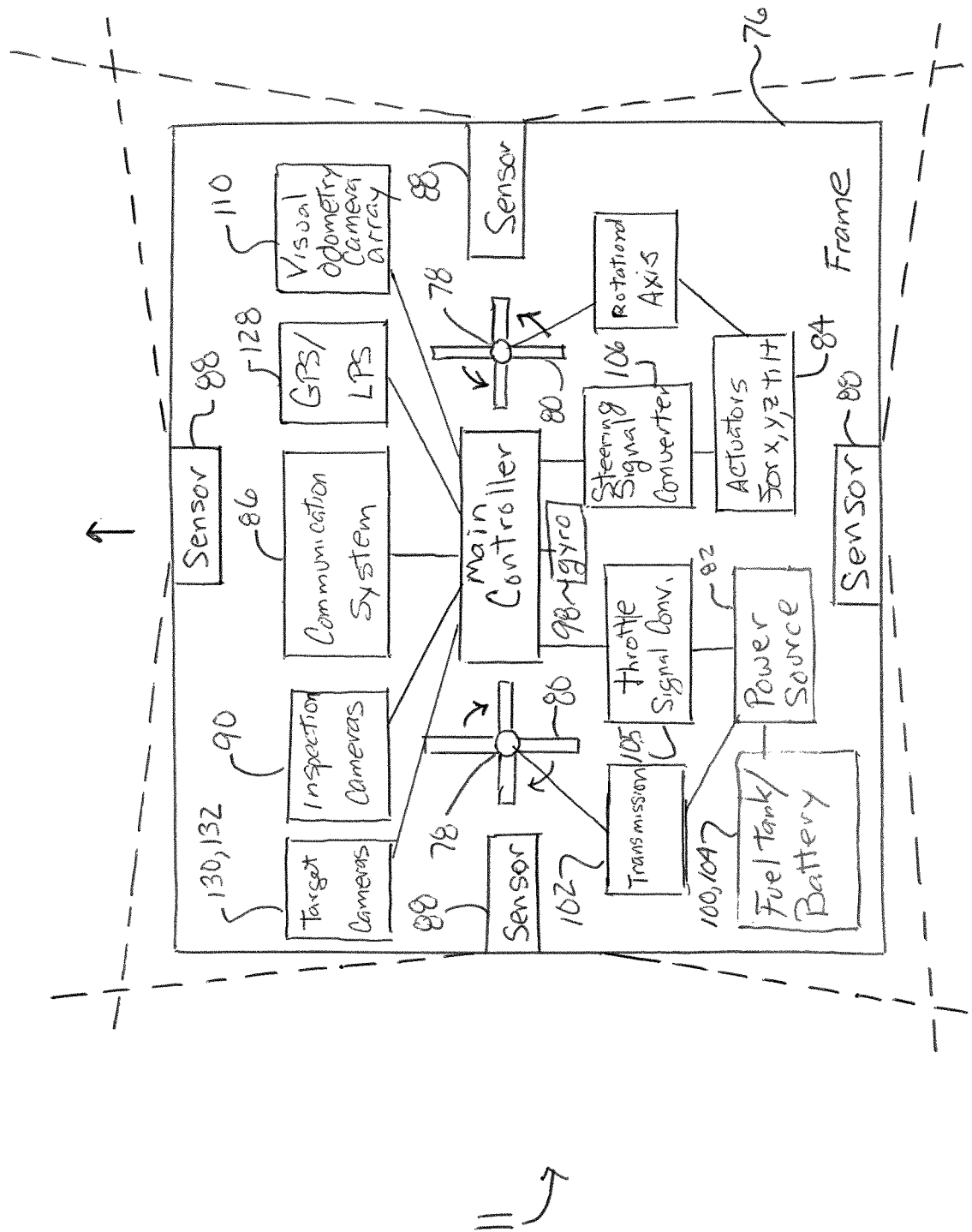
FIG. 5 is a top schematic view of the autonomous power trowel of FIG. 4.

FIGS. 4 and 5 illustrate an exemplary autonomous power trowel 11. The illustrated automated power trowel 11 includes a frame or body 76 supported by at least one rotor 78 having a plurality of troweling blades or paddles 80 for engaging the concrete, at least one power source 82 onboard the frame 76 for selectively rotating the at least one rotor 78 to finish the upper surface of the concrete slab or floor, at least one actuator 84 onboard the frame 76 for selectively tilting the at least one rotor 78, a communication system 86 onboard the frame 76 for communicating with at least one of the remote communication devices 18, 20, a plurality of sensors 88 onboard the frame 76 for sensing external boundaries 94 of the concrete and any obstacles 92 along the concrete, at least one inspection camera 90 onboard the frame 76 for viewing the upper surface of the concrete. The illustrated automated power trowel 11 also includes the onboard controller 12 onboard the frame 76 configured to selectively operate the at least one power source 82 to rotate the at least one rotor 78 to finish the concrete, to selectively operate the at least one actuator 84 to tilt the at least one rotor 78 to steer the frame and to move the frame 76 in a desired direction, to receive communications from the at least one remote communication device 18, 20 via the communications system 86, to receive signals from the plurality of sensors 88 to avoid the obstacles 92 and stay within the external boundaries 94, and to receive signals from the at least one inspection camera 90 to detect any surface blemish in the upper surface of the concrete.

The illustrated power trowel 11 includes two of the bladed rotors 78 which are counter rotating and laterally spaced-apart. The illustrated bladed rotors 78 downwardly project to frictionally contact the upper surface of the concrete for finishing. Any other suitable quantity and/or configuration of the rotors 78 can alternatively be can be utilized. The illustrated rotors 78 each include four equally spaced apart blades 80. Any other suitable quantity and/or configuration of the rotors 78 can alternatively be can be utilized.

The illustrated automated power trowel 11 preferably is supported on the concrete only by the rotors 78 or troweling blades 80 and the power trowel 11 preferably has no wheels or other supports engaging the concrete which may harm the finish of the concrete. Thus, the illustrated automated power trowel 11 also includes at least one gyro 98 to stabilize the automated power trowel 11 as it moves about the concrete. Any suitable quantity of the gyros 98 can be utilized or the gyro 98 can be eliminated if desired.

The illustrated rotors 78 are driven or rotated about their generally vertically-extending axes of rotation by the at least one power source 82 onboard the frame 76. The illustrated power source 82 is an internal combustion engine receiving fuel from an onboard fuel tank or reservoir 100 and suitably connected to the rotors 78 via a transmission 102 or the like. The engine can be of any suitable type such as, for example but not limited to, a gasoline engine fueled by gasoline fuel, a diesel engine fueled by diesel fuel, and the like or a combination thereof. The power source 82 can alternatively be of any other suitable type such as, for example but not limited to, an electric motor powered by an onboard battery or batteries 104, an electric motor powered by an electric generator and a cooperating fuel tank 100, and the like or a combination thereof. The at least one power source 82 is preferably a variable speed power source for precise maneuverability and a more precise concrete finish. The onboard controller 12 preferably controls operation of the power source 82. A throttle signal converter 105 can be utilized between the onboard controller 12 and the engine throttle.

The at least one actuator 84 for selectively tilting each of the rotors 78 can be of any suitable type such as, for example but not limited to, an electric actuator, a pneumatic actuator, a hydraulic actuator, or the like or a combination thereof. The actuator or actuators 84 preferably enable the rotational axes of each the rotors 78 to be tilted about at least the x and z axes, and more preferably about all three axes (x, y, and z). The axes of rotation of the rotors 78 are selectively tilted in a desired manner in order to steer and control movement of the power trowel 11 along the concrete. The onboard controller 12 preferably controls operation of the actuators 84 to steer and control movement of the power trowel 11 along the concrete. A steering signal converter 106 can be utilized between the onboard controller 12 and the actuators 84. A PLC (Programmable Logic Controller) receiver 108 can be utilized that can process those signals and send appropriate output signals to the controls. These controls respond to maneuver the automated power trowel 11 around obstacles 92 or within external boundaries 94. It is noted that steering can alternatively be provided in any other suitable manner.

The illustrated onboard communication system 86 enables communication between the onboard controller 12 and remote communication devices 18, 20 such as, for example, the service provider computer, the user mobile device, and the like or a combination thereof. The onboard communication system 86 can be of any suitable type such as, for example but not limited to, cellular, Wi-Fi, radio frequency (RF), microwave, Bluetooth, or the like or a combination thereof. The onboard communication 86 system enables the user to remotely provide commands to the power trowel 11 such as, for example but not limited to, power the power source 82 on or off and the like, remotely provide information such as, for example but not limited to, a desired path to be taken and the like, remotely view information such as, for example but not limited to, view images from cameras and the like, and remotely receive information form the power trowel 11 such as, for example but not limited to, receive warnings, status updates, and the like.

The illustrated onboard sensors 88 for sensing external boundaries 94 of the concrete and any obstacles 92 along the concrete are provided facing in the forward direction, the rearward direction, the left direction, and the right direction. The illustrated four sensors 88 are located at a base of the frame 76 above and near the rotors 78. It is noted that any other suitable quantity, operational direction, and/or location for the sensors 88 can alternatively be utilized. The illustrated onboard sensors 88 are Light Detection and Ranging (LIDAR) sensors but the onboard sensors 88 can alternatively be of any other suitable type such as, for example, but not limited to, cameras, proximity sensors, touch sensors, laser sensors, and the like or a combination thereof. The onboard sensors 88 are operably connected to the onboard controller 12 so that the power trowel 11 is desirably steered to stay within external and internal boundaries 94, 96 of the concrete and to avoid any obstacles 92 along the concrete.

Additional or alternative onboard sensors can be provided for sensing external boundaries 94 of the concrete and/or any obstacles 92 along the concrete. The illustrated embodiment includes a depth/odometry camera array 110 mounted on a vertical portion of a sensor stand 112 so that the camera array 110 is positioned above the frame 76. The illustrated camera array 110 includes five equally spaced-apart about the vertical portion of the sensor stand 112. It is noted that any other suitable quantity, operational direction, and/or location for the cameras can alternatively be utilized. The visual odometry cameras are operatively connected to the onboard controller 12 for determining and using the odometry information using sequential camera images to estimate the position and orientation of the power trowel 11, distance traveled, and the like or a combination thereof. The depth/odometry camera array 110 can be eliminated if desired.

The illustrated embodiment also includes a camera/sensor 114 and a laser sensor 116 at each corner of the frame 76 for sensing external boundaries 94 of the concrete and/or any obstacles 92 along the concrete. The laser sensors 116 can be particularly helpful in determining a distance to a boundary 94, 96 or an obstacle 92. It is noted that any other suitable quantity, operational direction, and/or location for the cameras/sensors a 114 and/or laser sensors 116 can alternatively be utilized. The cameras/sensors 114 and/or laser sensors 116 are operatively connected to the onboard controller 12. The cameras/sensors 114 and/or laser sensors 116 can be eliminated if desired.

The onboard inspection cameras 90 provide a view of an upper surface of the concrete in order to detect blemishes in the surface of the concrete. The illustrated power trowel 11 has two of the inspection cameras 90 which are laterally spaced-apart and forwardly/downwardly facing to view the concrete in front of and near the power trowel 11. It is noted that any other suitable quantity, operational direction, and/or location for the inspection cameras 90 can alternatively be utilized. The onboard inspection cameras 90 are operably connected to the onboard controller 12 so that the onboard controller 12 can automatically detect blemishes in the surface of the concrete and/or the images can be sent to the user remote device 20 for viewing and detecting surface blemishes by the user. When a blemish is detected, the onboard controller 12 can automatically take corrective action and/or selectively provide images to the remote communication devices 18, 20. The user can also selectively receive live real-time images from the power trowel 11 of the concrete using their mobile device or remote computer 20. Additionally, the onboard controller 12 of the automated power trowel 11 is preferably configured to automatically send alerts to the mobile device 20 of the user and/or the service provider computer 18 when there is a problem such as a detected blemish, when fuel or a battery level is low, when the concrete finishing is complete, and the like, or a combination thereof.

Figure 6:
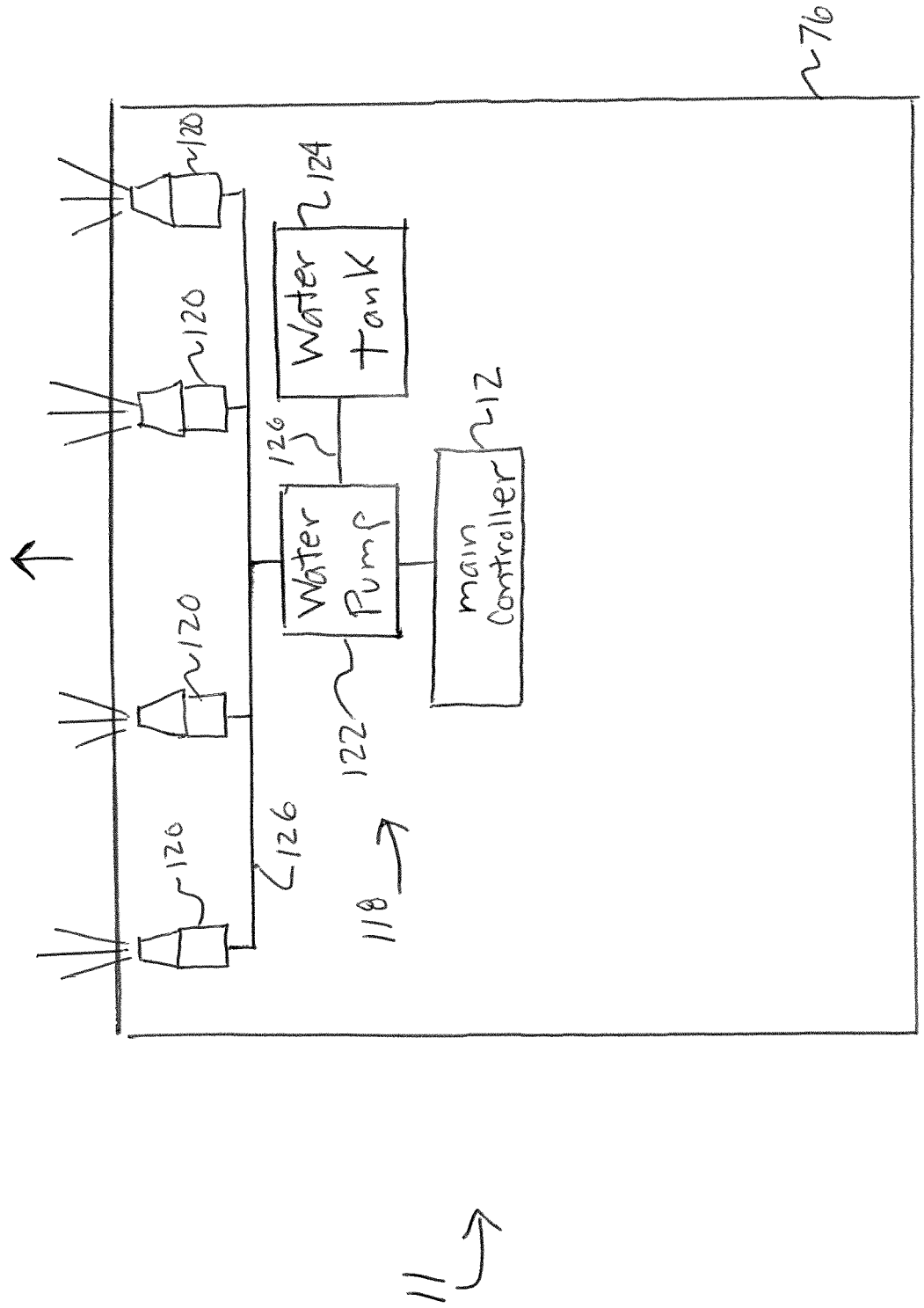
FIG. 6 is a top schematic view of a water system of the autonomous power trowel of FIG. 4.

The illustrated power trowel 11 is also provided with a watering system 118 for spraying or throwing water onto the surface of the concrete (best seen in FIGS. 4 and 6). The illustrated watering system 118 includes a plurality of water spray nozzles 120, a water pump 122, and water tank or reservoir 124. The illustrated watering system 118 has four of the water nozzles 120 which are laterally spaced-apart and forwardly/downwardly facing to spray the concrete in front of and near the power trowel 11. It is noted that any other suitable quantity, operational direction, and/or location for the water nozzles 120 can alternatively be utilized. The water pump 122 connects the water tank 124 with the water nozzles 120 so that the onboard controller 12 can selectively power the water pump 122 to spray water from the nozzles. Suitable water piping 126 is provided between the water tank 124 and the water pump 122 and between the water pump 122 and the water nozzles 120. The onboard water pump 122 operably connected to the onboard controller 12 so that the onboard controller 12 can control operation of the water pump 122. When a surface blemish is detected in the concrete, the onboard controller 12 can spray water via the watering system 118 onto the surface blemish either automatically or upon user command. The wetted area can then be re-worked or finished by the rotors 78 to remove the surface blemish. This process can be repeated as needed to remove the surface blemish.

The illustrated power trowel 11 includes a guidance system such as, for example but not limited to, a GPS (Global Positioning System) or LPS (Local Positioning System) unit 128 operably connected to the onboard controller 12. The GPS or PPS unit 128 can be eliminated if desired and the navigation system can utilize the output of any combination of the above described cameras and sensors.

The illustrated onboard controller or computer 12 is configured to autonomously operate the automated power trowel 11 when instructed by the operator to finish the upper surface of the concrete. The onboard controller 12 moves the automated power trowel 11 over the concrete (by a combination of rotating the trowel blades 80 at a desired speed and/or tilting the trowel blades 80 to a desired angle) to finish the concrete within predetermined height and/or levelness parameters within the desired boundary 94, 96. The signals from the sensors 88 enable the automated power trowel 11 to automatically stay within the external boundaries 94 of the concrete and around any obstacles 92 within the concrete boundaries 94, 96 such as, for example but not limited to, support poles and the like. The automated power trowel 11 automatically goes wherever it needs to go the finish the concrete within the desired parameters. The path taken by the automated power trowel 11 can be randomly generated to cover the entire area of concrete within the external boundaries 94 or a desired portion thereof using internal boundaries 96 as described herein below, a predetermined path to cover the entire area of concrete within the external boundaries 94 or a desired portion thereof using internal boundaries 96 as described herein below, a generated path based on current conditions to cover the entire area of concrete within the external boundaries 94 or a desired portion thereof using internal boundaries 96 as described herein below, or a combination thereof. Once the concrete finishing is complete, the onboard controller 12 automatically shuts off all systems of the power trowel 11. Thus, the operator does not need to remain on the work-site 14 while the automated power trowel 11 finishes the concrete.

Figure 7:
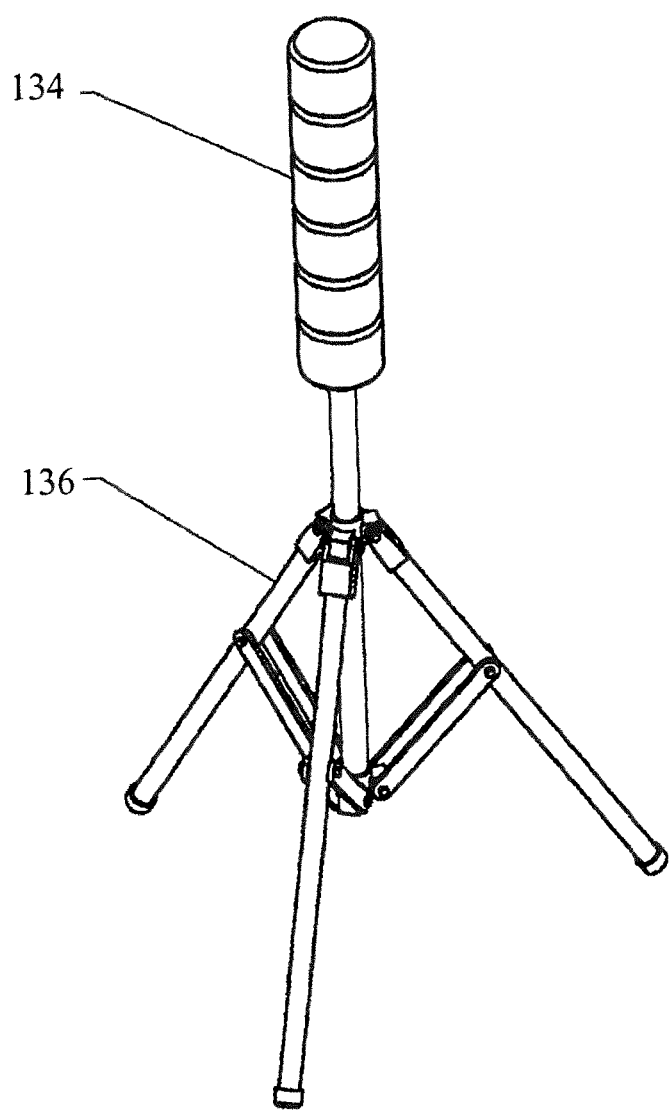
FIG. 7 is a perspective view of a retroreflective target for use with the autonomous power trowel of FIG. 4.
Figure 8:
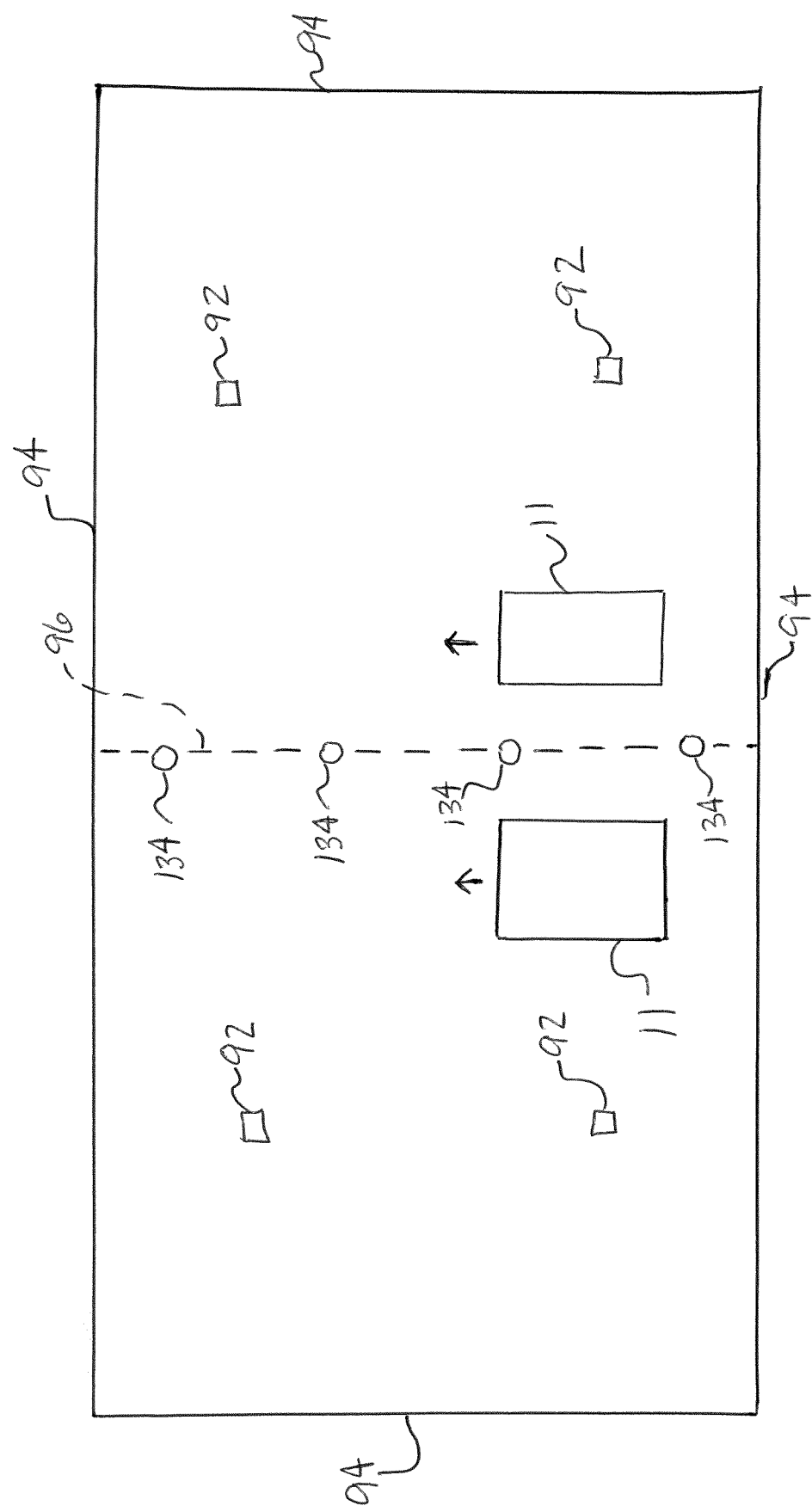
FIG. 8 is a schematic top view of a concrete floor or slab utilizing the retroreflective targets of FIG. 7 to define an internal boundary within external boundaries of the concreate floor or slab.

The illustrated power trowel 11 also includes a system for forming internal boundaries 96 of the concrete so only a portion of the concrete can be finished by a single power trowel 11 when the concrete is too large to timely finish the entire upper surface with a single power trowel 11 (best seen in FIGS. 5, 7 and 8). The illustrated internal boundary system includes left and right stereoscopic camera arrays 130, 132 and one or more colored retroreflective vision targets 134. The illustrated stereoscopic camera arrays 130, 132 mounted on a horizontal portion of the sensor stand 112 so that the arrays 130, 132 are laterally spaced apart and positioned above the frame 76. The illustrated camera arrays 130, 132 each include three equally spaced-apart cameras about a vertical axis of the array 130, 132. It is noted that any other suitable quantity, operational direction, and/or location for the cameras can alternatively be utilized. The left and right stereoscopic camera arrays 130, 132 are operatively connected to the onboard controller 12 for determining the position of the retroreflective vision targets 134 that form an internal boundary 96 of the concrete so that the power trowel 11 can be controlled to stay within the internal boundary 96. The internal boundary system can be eliminated if desired.

The illustrated colored retroreflective vision targets 134 are cylindrically shaped and vertically oriented but the retroreflective vision targets 134 can alternatively have any other shape and/or orientation. The illustrated colored retroreflective vision targets 134 are held by a tripod stand 136 which can rest on the surface of the concrete. The retroreflective vision targets 134 can alternatively be held in any other suitable manner. One or more retroreflective vision targets 134 can be utilized for form an internal boundary 96 for the concrete floor or slab (best shown in FIG. 8) which can be utilized by the onboard controller 12 to maneuver the power trowel 11 to avoid crossing the internal boundary 96. Such an internal boundary 96 can be useful when the power trowel 11 is being used to finish only a portion of a relatively large concrete slab or floor. For example, when the concrete slab or floor is too large to be finished by a single power trowel 11 within a required period of time.

The illustrated power trowel 11 also includes a telescopic arm 138 having a corner trowel 140 at the free end of the telescopic arm 138 (best shown in FIG. 4). The corner trowel 240 is sized and shaped to finish the concrete in corners and other tight spaces where the rotor blades 80 cannot reach. The telescopic arm 138 is extended and retracted and moved with one or more actuators controlled by the onboard controller 12 to manipulate the corner trowel 140 in a manner adequate to finish the desired portion of the concrete. The illustrated telescopic arm 138 is provided with a camera/sensor 114 and a laser sensor 116 in order to provide information for manipulation of the corner trowel 140 and the condition concrete. The illustrated cameras/sensors 114 and/or laser sensors 116 are operatively connected to the onboard controller 12. It is noted that any other suitable type of cameras and/or sensors can alternatively be utilized. The telescopic arm 138 can be eliminated if desired.

It is noted that each of the features of the various disclosed embodiments of the present invention can be utilized in any combination with each of the other disclosed embodiments of the present invention.

The preferred embodiments of this invention can be achieved by many techniques and methods known to persons who are skilled in this field. To those skilled and knowledgeable in the arts to which the present invention pertains, many widely differing embodiments will be suggested by the foregoing without departing from the intent and scope of the present invention. The descriptions and disclosures herein are intended solely for purposes of illustration and should not be construed as limiting the scope of the present invention.

What is claimed is:

1. A power trowel for finishing a concrete slab or floor, comprising:
a frame supported by at least one rotor having a plurality of troweling blades for engaging a concrete slab or floor;
at least one power source onboard the frame for selectively rotating the at least one rotor to finish the concrete;
at least one actuator onboard the frame for selectively tilting the at least one rotor;
a communication system onboard the frame for communicating with at least one remote communication device;
a plurality of sensors onboard the frame for sensing external boundaries of the concrete;
a sensor stand mounted on the frame and positioned above the frame;
first and second stereoscopic camera arrays adapted to cooperate with one or more colored retroreflective visual targets to form an internal boundary of the concrete;
wherein the first and second stereoscopic cameras are laterally spaced-apart and above the frame on the sensor stand extending above the frame;
wherein the colored retroreflective vision targets are cylindrically shaped and vertically oriented;
a controller onboard the frame configured to selectively operate the at least one power source to rotate the at least one rotor to finish the concrete and to shut off the power trowel when the finish is complete, to selectively operate the at least one actuator to tilt the at least one rotor to steer the frame and to move the frame in a desired direction, to receive communications from the at least one remote communication device via the communications system, to receive signals from the plurality of sensors to stay within the external boundaries, and to receive signals from the first and second stereoscopic camera arrays to stay within the internal boundary;
a corner trowel for finishing one or more spaces of the concrete slab or floor where the at least one rotor cannot reach; and
an extendable telescopic arm onboard the frame for selectively positioning the corner trowel.

2. The power trowel of claim 1, wherein the at least one remote communicating device is a mobile phone.

3. The power trowel of claim 1, wherein the at least one power source is a variable speed power source.

4. The power trowel of claim 1, further comprising at least one odometry camera array onboard a horizontal portion of the sensor stand and in communication with the onboard controller.

5. The power trowel of claim 1, further comprising at least one gyro onboard the frame for stabilization of the frame.

6. The power trowel of claim 1, further comprising a water spray system onboard the frame and including at least one water spray nozzle, a water pump, and a water reservoir spraying a detected surface blemish in the upper surface of the concrete with water using the water spray system, wherein the at least one spray nozzle is forwardly and downwardly facing to spray the concrete in front of and near the power troll and the controller initiates the spray of water when one of the controller detects a blemish and the controller receives an initiation signal from the remote communication device.

7. The power trowel of claim 1, further comprising at least one inspection camera onboard the frame and forwardly and downwardly facing for viewing an upper surface of the concrete in front of and near the power trowel, wherein the controller is configured to at least one of detect any surface blemish in the upper surface of the concrete from the images received from the at least one inspection camera and send the images received from the at least one inspection camera to the at least one remote communication device.

8. A method for finishing concrete using a power trowel, the power trowel comprising a frame supported by at least one rotor having a plurality of troweling blades for engaging a concrete slab or floor, at least one power source onboard the frame for selectively rotating the at least one rotor to finish the concrete, at least one actuator onboard the frame for selectively tilting the at least one rotor, a communication system onboard the frame for communicating with at least one remote communication device, a plurality of sensors onboard the frame for sensing external boundaries of the concrete, at least one inspection camera onboard the frame and forwardly and downwardly facing for viewing an upper surface of the concrete in front of and near the power trowel, a corner trowel for finishing one or more spaces of the concrete slab or floor where the at least one rotor cannot reach, an extendable telescopic arm onboard the frame for selectively positioning the corner trowel, and an onboard controller, wherein the controller is configured to at least one of detect any surface blemish in the upper surface of the concrete from the images received from the at least one inspection camera and send the images received from the at least one inspection camera to the at least one remote communication device, the method comprising the steps of:
- selectively operating the at least one power source via the onboard controller to rotate the at least one rotor to finish the concrete;
- selectively operating the at least one power source to shut off the power trowel when the finish is complete;
- selectively operating the at least one actuator via the onboard controller to tilt the at least one rotor to steer the frame and to move the frame in a desired direction;
- selectively operating the at least one actuator via the onboard controller to move the extendable telescopic arm in a desired direction;
- activating the corner trowel to finish the concrete via movement of the extendable telescopic arm;
- receiving communications to the onboard controller from the at least one remote communication device via the communications system;
- receiving signals via the controller from the plurality of sensors to stay within the external boundaries of the concrete; and
- receiving signals via the onboard controller from the at least one inspection camera to detect any surface blemish in the upper surface of the concrete.

9. The method of claim 8, wherein the at least one remote communicating device is a mobile phone.

10. The method of claim 8, wherein the at least one power source is a variable speed power source.

11. The method of claim 8, wherein the power trowel further comprises at least one odometry camera array onboard the frame and in communication with the onboard controller.

12. The method of claim 8, wherein the power trowel further comprises at least one gyro onboard the frame for stabilization of frame.

13. The method of claim 8, wherein the power trowel further comprising a water spray system onboard the frame and including at least one water spray nozzle, a water pump, and further comprising the step of spraying a detected surface blemish in the upper surface of the concrete with water using the water spray system, wherein the at least one spray nozzle is forwardly and downwardly facing to spray the concrete in front of and near the power troll and the controller initiates the spray of water when one of the controller detects a blemish the controller receives an initiation signal from the remote communication device.

14. The method of claim 8, wherein the power trowel further comprises first and second stereoscopic camera arrays adapted to cooperate with one or more colored retroreflective visual targets to form an internal boundary of the concrete and further comprising the step of receiving signals from the first and second stereoscopic camera arrays via the controller to stay within the internal boundary, wherein the first and second stereoscopic cameras are laterally spaced-apart and above the frame on a sensor stand extending above the frame; wherein the colored retroreflective vision targets are cylindrically shaped and vertically oriented.

* * * * *

UNITED STATES PATENT AND TRADEMARK OFFICE
CERTIFICATE OF CORRECTION

| | | |
|---|---|---|
| PATENT NO. | : 11,719,005 B2 | Page 1 of 1 |
| APPLICATION NO. | : 16/683195 | |
| DATED | : August 8, 2023 | |
| INVENTOR(S) | : Merlie Schwartz | |

It is certified that error appears in the above-identified patent and that said Letters Patent is hereby corrected as shown below:

On the Title Page

Column 1, Item (60), add --Provisional application No. 62/760,540, filed on November 13, 2018--.

Signed and Sealed this
Sixth Day of February, 2024

Katherine Kelly Vidal
*Director of the United States Patent and Trademark Office*